US012756674B1

(12) United States Patent
Henkel et al.

(10) Patent No.: US 12,756,674 B1
(45) Date of Patent: Oct. 6, 2026

(54) NETWORK UTILIZATION-AWARE SCHEDULER FOR CONTAINER ORCHESTRATION SYSTEMS

(71) Applicant: Juniper Networks, Inc., Sunnyvale, CA (US)

(72) Inventors: Michael Henkel, Saratoga, CA (US); Chandrabhan Singh, Bokaro (IN); FNU Nadeem, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 75 days.

(21) Appl. No.: 18/478,341

(22) Filed: Sep. 29, 2023

(51) Int. Cl.
*H04L 47/83* (2022.01)

(52) U.S. Cl.
CPC .................................... *H04L 47/83* (2022.05)

(58) Field of Classification Search
CPC ........................................................ H04L 47/83
See application file for complete search history.

(56) References Cited

U.S. PATENT DOCUMENTS 9,571,394 B1 2/2017 Sivaramakrishnan et al.
10,708,082 B1 7/2020 Bakiaraj et al.
10,728,145 B2 7/2020 Rao et al.
11,316,822 B1 * 4/2022 Gawade .............. G06F 11/2025
11,792,301 B1 * 10/2023 Du ...................... H04L 67/1001 709/226
2015/0180761 A1 * 6/2015 Watanabe ............... H04L 67/51 709/238
2021/0051113 A1 * 2/2021 Liu ......................... H04L 47/76
2021/0320853 A1 * 10/2021 Kulshreshtha .......... H04L 43/04
2022/0197773 A1 * 6/2022 Butler ...................... G06F 9/505
2022/0291941 A1 * 9/2022 Featonby .............. G06F 9/5077

FOREIGN PATENT DOCUMENTS

WO 2013184846 A1 12/2013

OTHER PUBLICATIONS

Juniper Networks, “Cloud Native Contrail Networking: Installation and Life Cycle Management Guide for Upstream Kubernetes”, Engineering Simplicity, Jul. 20, 2023, 85 pp.
U.S. Appl. No. 18/468,538, filed Sep. 15, 2023, naming inventors Miriyala et al.

* cited by examiner

*Primary Examiner* — Joe Chacko
(74) *Attorney, Agent, or Firm* — Shumaker & Sieffert P.A.

(57) ABSTRACT

In general, techniques are described for deploying workloads of containerized services to worker nodes in a network using network telemetry-aware scheduling. In an example, a method comprises obtaining, by a computing system, network utilization data for one or more worker nodes, wherein each worker node is capable of executing one or more workloads. The method further comprises determining, by the computing system and based on the network utilization data and a network requirement of a new workload, one or more candidate worker nodes from the one or more worker nodes that satisfy the network requirement of the new workload. The method further comprises scheduling, by the computing system, the new workload to a candidate worker node of the one or more candidate worker nodes.

20 Claims, 6 Drawing Sheets

NETWORK UTILIZATION-AWARE SCHEDULER FOR CONTAINER ORCHESTRATION SYSTEMS

TECHNICAL FIELD

The disclosure relates to computing systems and, more specifically, to container orchestration systems.

BACKGROUND

Computer networks have become ubiquitous and the number of network applications, network-connected devices, and types of network-connected devices are rapidly expanding. Such devices now include computers, smart phones, Internet-of-Things (IOT) devices, cars, medical devices factory equipment, etc. An end-user network-connected device typically cannot directly access a public network such as the Internet. Instead, an end-user network device establishes a network connection with an access network, and the access network communicates with a core network that is connected to one or more packet data networks (PDNs) offering services. There are several different types of access networks currently in use. Examples include Radio Access Networks (RANs) that are access networks for 3rd Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The core network may be that of a mobile service provider network, such as a 3G, 4G/LTE, or 5G network.

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical central processing unit (CPU), virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise information technology (IT) staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). These systems are characterized by being dynamic and ephemeral, as hosted services can be quickly scaled up or adapted to new requirements. Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual computing instances, such as containers or VMs, as well as among applications running on legacy (e.g., physical) environments. Software-defined networking contributes to network management.

SUMMARY

In general, techniques are described for deploying workloads of containerized services to worker nodes in a network using network utilization-aware scheduling. For example, metric exporters obtain network configuration and utilization data from virtual routers executing on worker nodes to provide network connectivity to workloads on the worker nodes. A central collector collects network utilization data from the metric exporters, based on such metrics, a custom scheduler for a container orchestration system selects one of the worker nodes on which to schedule a workload. For instance, the custom scheduler may determine which of the worker nodes satisfy the network requirements of a new workload and schedule the new workload to one or more of the worker nodes that meet the network requirements.

For example, based on receiving information regarding a new workload, the scheduler for the container orchestration system may process the network utilization data and compare one or more network requirements of the new workload to a datastore of the network utilization data of the worker nodes. In some examples, the scheduler may then identify one or more candidate worker nodes that meet the requirements of the new workload and schedule the workload to one of the candidate worker nodes.

The techniques of this disclosure provide one or more advantages that realize one or more practical applications. Container orchestration systems includes a default scheduler that considers memory and CPU utilization of individual worker nodes to determine the most appropriate node to run a container workload on. Such schedulers do not consider network utilization as part of the scheduling determination for a workload. Because network resources on a worker node are limited, and some applications have specific requirements for the availability of these resources, a scheduler that applies techniques of this disclosure can better satisfy workload requirements for such application by ensuring placement to a worker node that can cannot provide the required network resources.

In one example, this disclosure describes a computing system comprising processing circuitry having access to storage media and configured to obtain network utilization data for one or more worker nodes, wherein each worker node is capable of executing one or more workloads; determine, based on the network utilization data and a network requirement of a new workload, one or more candidate worker nodes from the one or more worker nodes that satisfy the network requirement of the new workload; and schedule the new workload to a candidate worker node of the one or more candidate worker nodes.

In another example, this disclosure describes a method comprising obtaining, by a computing system, network utilization data for one or more worker nodes, wherein each worker node is capable of executing one or more workloads; determining, by the computing system, based on the network utilization data and a network requirement of a new workload, one or more candidate worker nodes from the one or more worker nodes that satisfy the network requirement of the new workload; and scheduling, by the computing system, the new workload to a candidate worker node of the one or more candidate worker nodes.

In another example, this disclosure describes non-transitory computer-readable storage media comprising instructions that, when executed, configure one or more processors to obtain network utilization data for one or more worker nodes, wherein each worker node is capable of executing one or more workloads; determine, based on the network utilization data and a network requirement of a new workload, one or more candidate worker nodes from the one or more worker nodes that satisfy the network requirement of the new workload; and schedule, the new workload to a candidate worker node of the one or more candidate worker nodes.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
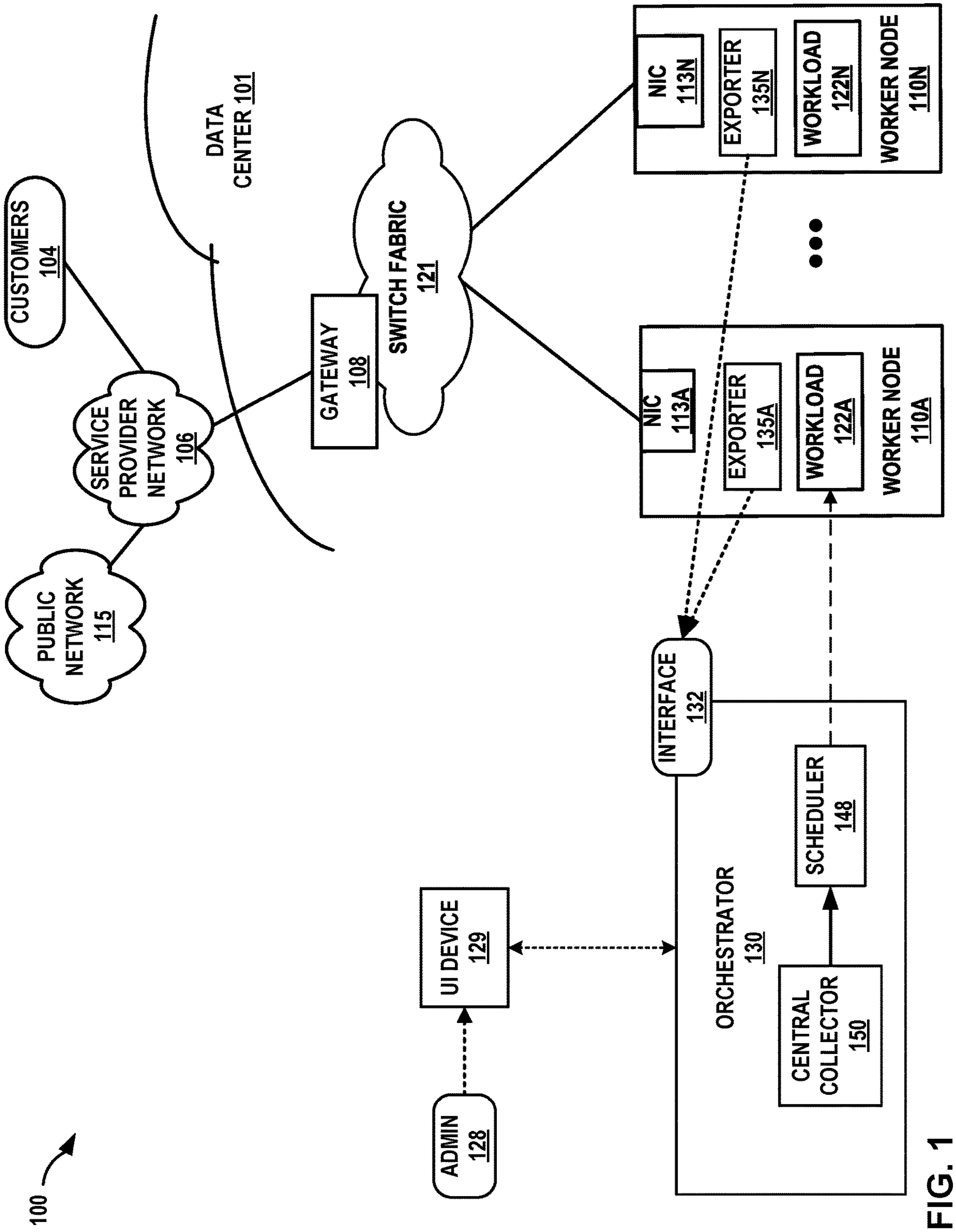
FIG. 1 is a block diagram illustrating an example computing infrastructure in which examples of the techniques described herein may be implemented.

FIG. 1 is a block diagram illustrating an example computing infrastructure 100 in which examples of the techniques described herein may be implemented. In general, data center 101 provides an operating environment for applications and services for customer sites 104 (illustrated as "customers 104") having one or more customer networks coupled to the data center by service provider network 106. Data center 101 may, for example, host infrastructure equipment, such as networking and storage systems, redundant power supplies, and environmental controls. Service provider network 106 is coupled to public network 115, which may represent one or more networks administered by other providers, and may thus form part of a large-scale public network infrastructure, e.g., the Internet. Public network 115 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 106, an enterprise IP network, or some combination thereof.

Although customer sites 104 and public network 115 are illustrated and described primarily as edge networks of service provider network 106, in some examples, one or more of customer sites 104 and public network 115 may be tenant networks within data center 10 or another data center. For example, data center 101 may host multiple tenants (customers) each associated with one or more virtual private networks (VPNs), each of which may implement one of customer sites 104.

Service provider network 106 offers packet-based connectivity to attached customer sites 104, data center 101, and public network 115. Service provider network 106 may represent a network that is owned and operated by a service provider to interconnect a plurality of networks. Service provider network 106 may implement Multi-Protocol Label Switching (MPLS) forwarding and in such instances may be referred to as an MPLS network or MPLS backbone. In some instances, service provider network 106 represents a plurality of interconnected autonomous systems, such as the Internet, that offers services from one or more service providers.

In some examples, data center 101 may represent one of many geographically distributed data centers in which the techniques and systems described herein may be implemented. As illustrated in the example of FIG. 1, data center 101 may be a facility that provides network services, cloud services, storage services, and/or application services for customers. Data center 101 may represent an on-premises data center, a private cloud, a public cloud, a hybrid cloud, or other type of deployment. A customer of the service provider may be a collective entity such as enterprises and governments or individuals. For example, a data center may host web services for several enterprises and end users. Other exemplary services may include data storage, virtual private networks, traffic engineering, file service, data mining, scientific- or super-computing, and so on. Although illustrated as a separate edge network of service provider network 106, elements of data center 101 such as one or more physical network functions (PNFs) or virtualized network functions (VNFs) may be included within the service provider network 106 core.

Switch fabric 121 may include interconnected top-of-rack (TOR) (or other "leaf") switches coupled to a distribution layer of chassis (or "spine" or "core") switches. Although not shown, data center 101 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 101 may also include one or more physical network functions (PNFs) such as physical firewalls, load balancers, routers, route reflectors, broadband network gateways (BNGs), Evolved Packet Cores or other cellular network elements, and other PNFs.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Any server of data center 101 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 101. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter edge router (not shown in FIG. 1). Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of switch fabric 121 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below, virtual routers running in the kernels or hypervisors of the servers of data center 101 may create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the servers. (Gateway routers or switches that connect a virtual network to a physical network are an exception and may contain tenant MAC or IP addresses.)

The virtual routers of the servers of data center 101 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router needs to contain all IP prefixes or all MAC addresses for all virtual machines in the entire data center. A given virtual router only needs to contain those routing instances that are locally present on the server (i.e., which have at least one virtual execution element present on the server.)

The control plane protocol between the control plane nodes of a network controller or a physical gateway router (or switch) may be BGP (and may be Netconf for management). This is the same control plane protocol may also be used for MPLS L3VPNs and MPLS EVPNs. The protocol between the network controller and the virtual routers may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

In the example of FIG. 1, data center 101 includes storage and/or compute servers (worker nodes 110A-110N) interconnected via switch fabric 121 provided by one or more tiers of physical network switches and routers, with worker node 110A-110N (herein, "worker nodes 110") depicted as coupled to switch fabric 121. Worker nodes 110 may be bare metal machines and/or virtual machines within data center 101 and may also be referred to herein as "hosts" or "host devices." Each of worker nodes 110 may represent a computing device, such as an x86 processor-based server, configured to operate according to techniques described herein.

Worker nodes 110 host virtual network endpoints for one or more virtual networks that operate over the physical network represented here by switch fabric 121. Although described primarily with respect to a data center-based switching network, other physical networks, such as service provider network 106, may underlay the one or more virtual networks.

Each of worker nodes 110 may host one or more virtual execution elements such as each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, worker node 110A hosts one virtual network endpoint having one or more containers. However, a worker node 110 may execute as many virtual execution elements as is practical given hardware resource limitations of the worker node 110. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 113A to perform packet I/O and receive/send packets on one or more communication links with switch fabric 121. Other examples of virtual network interfaces are described below.

Worker nodes 110 each include at least one network interface card (NIC) 113, which is composed of at least one interface to exchange packets with switch fabric 121 over a communication link. For example, worker node 110A includes NIC 113A. Any of NICs 113 may provide one or more virtual hardware components for virtualized input/output (I/O). A virtual hardware component for I/O maybe a virtualization of a physical NIC 113 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the worker node 110. In this way, the virtual network endpoints may share the same PCIe physical hardware resources and the virtual functions are examples of virtual hardware components.

As another example, one or more of the servers executing worker nodes 110 may implement Virtio, a para-virtualization framework available, e.g., for the Linux Operating System, that provides emulated NIC functionality as a type of virtual hardware component to provide virtual network interfaces to virtual network endpoints. As another example, one or more of the servers may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions.

In some examples, any worker nodes 110 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, Contrail virtual router, OpenContrail virtual router, CN2 virtual router, or other device and/or software that is located on a host device and performs switching, bridging, or routing packets among virtual network endpoints of one or more virtual networks, where the virtual network endpoints are hosted by one or more of worker nodes 110.

Virtual routers (not shown in FIG. 1 but described with respect to virtual router 223 of FIG. 2 below) of worker nodes 110 terminate virtual network overlay tunnels and determine virtual networks for received packets based on tunnel encapsulation headers for the packets, and forwards packets to the appropriate destination virtual network endpoints for the packets. For worker node 110A, for example, for each of the packets outbound from virtual network endpoints hosted by worker node 110A (e.g., workload 122A), the virtual router attaches a tunnel encapsulation header indicating the virtual network for the packet to generate an encapsulated or "tunnel" packet, and the virtual router outputs the encapsulated packet via overlay tunnels for the virtual networks to another node, such as another one of worker nodes 110. As used herein, a virtual router may execute the operations of a tunnel endpoint to encapsulate inner packets sourced by virtual network endpoints to generate tunnel packets and decapsulate tunnel packets to obtain inner packets for routing to other virtual network endpoints.

Worker nodes 110 include respective exporters 135A-135N (hereinafter "exporters 135"). In some examples, where the virtual router is containerized, exporters 135 may execute each as a sidecar container that runs alongside the main virtual router container within a Pod or other deployment unit within worker nodes 110. For example, exporters 135 may listen to virtual router events and communications and in this way collect network information from the virtual routers about network utilization of the corresponding worker node. Exporters 135 in this way may obtain and export network configuration and utilization data of worker nodes 110. For example, exporters 135 may collect messages generated by the virtual routers regarding network utilization and configuration. In another example, exporters 135 may collect JSON messages that are communicated from the virtual routers using the Sandesh protocol.

Exporters 135 may process the messages received from the virtual routers. Exporters 135 may receive the messages from the virtual routers and process them before providing them to orchestrator 130 via interface 132. Exporters 135 may process the message to determine which messages are to be dropped and which messages are to be provided to orchestrator 130. Exporters 135 may drop messages based on one or more filter rules. For example, exporters 135 may drop messages based on filter criteria configured by orchestrator 130 in a subscription datastore. In another example, exporters 135 may read subscription information stored in a subscription datastore and export messages based on the subscription information. Exporters 135 may drop the messages and forward messages that meet filter criteria of consumers of the messages such as orchestrator 130. In an example, exporters 135 provide all of the messages received from the virtual routers to a data collection platform such as Fluentd and provide a filtered set of messages to orchestrator 130.

Computing infrastructure 100 implements an automation platform for automating deployment, scaling, and operations of virtual execution elements across worker nodes 110 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 100 include at least worker nodes 110, orchestrator 130, and UI device 129. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes. Worker nodes 110 may represent such a cluster.

Orchestrator 130 implements a scheduler 148 for the computing infrastructure 100. Orchestrator 130 may be a distributed or centralized application that executes on one or more computing devices of a computing system. Orchestrator 130 may implement respective master nodes for one or more clusters each having one or more minion nodes implemented by one or more servers of computing infrastructure 100. Additional information regarding orchestrator 130 operating in conjunction with other devices of data center 101 or other software-defined network is found in International Application Number PCT/US2013/044378, filed Jun. 5, 2013, and entitled "PHYSICAL PATH DETERMINATION FOR VIRTUAL NETWORK PACKET FLOWS;" in U.S. patent application Ser. No. 14/226,509, filed Mar. 26, 2014, and entitled "Tunneled Packet Aggregation for Virtual Networks;" each of which is incorporated by reference as if fully set forth herein. U.S. patent application Ser. No. 14/226,509 also includes further description of a virtual router, described elsewhere in this disclosure.

In general, orchestrator 130 controls the deployment, scaling, and operations of virtual execution elements across clusters of servers and providing computing infrastructure, which may include container-centric computing infrastructure. Orchestrator 130 may implement respective cluster masters for one or more Kubernetes clusters. As an example, Kubernetes is a container management platform that provides portability across public and private clouds, each of which may provide virtualization infrastructure to the container management platform. Orchestrator 130 may represent any of the above-listed orchestration platforms, e.g., Kubernetes. Although illustrated as separate, orchestrator 130 (or components thereof) may execute on worker nodes 110.

Each of workloads 122A-122N is an example of a virtual network endpoint and a virtual execution element. Workloads 122 may each represent or include one or more containers deployed by a container orchestration system such as orchestrator 130. One or more of workloads 122 may collectively implement a distributed application. Each of workloads 122 may provide or implement one or more services and, where workloads 122 represent Pods or other container deployments, the one or more services are containerized services or "microservices".

In Kubernetes, a Pod is a group of one or more logically-related containers (not shown in FIG. 1), the shared storage for the containers, and options on how to run the containers. Where instantiated for execution, a pod may alternatively be referred to as a "pod replica." Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

In Kubernetes, by default all pods can communicate with all other pods without using network address translation (NAT). In some cases, the orchestrator 130 creates a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 130. When a user creates an isolated namespace for a pod, orchestrator 130 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

Further examples of techniques involving virtual execution elements are described in MULTIPLE VIRTUAL NETWORK INTERFACE SUPPORT FOR VIRTUAL EXECUTION ELEMENTS, U.S. application Ser. No. 16/118,107, filed Aug. 20, 2018; and UNIFIED CONTROL PLANE FOR NESTED CLUSTERS IN A VIRTUALIZED COMPUTING INFRASTRUCTURE, U.S. application Ser. No. 16/118,731, filed Aug. 31, 2018, the entire contents of each of which are incorporated by reference herein.

Orchestrator 130 includes scheduler 148. Scheduler 148 may be a component or plugin of orchestrator 130. Scheduler 148 may schedule workloads 122A-122N (collectively, "workloads 122") to worker nodes 110. In general, scheduler 148 may manage the placement of each of workloads 122 to worker nodes 110 according to scheduling policies, the amount of resources requested for the workload, and available resources of worker nodes 110. Worker node resources considered by the scheduler 148 when assigning workloads 122 to worker nodes 110 include CPU-related resources (e.g., cores, CPU/core utilization), memory-related resources (e.g., available main memory), ephemeral storage, and user-defined extended resources. In Kubernetes, the scheduler is known as kube-scheduler.

Application workloads 122 may have distinct performance requirements that need to be met within a highly dynamic application execution environment. In such an environment, application performance is the artifact of dynamics of different resources such as worker node resources; network resources (e.g., bandwidth, latency, loss, jitter, firewall policies), network policies, and the communication graph among different services of a distributed application; as well as the performance of external services such as authentication and external cloud services.

In application execution environments, the performance of different applications and underlying networks are impacted by how different workloads of application services are scheduled among the worker nodes. Applications may have different QoS and resource requirements that need to be met while scheduling it across worker nodes 122 which can be distributed within data center 101 or across WAN boundaries, e.g., of networks 106, 115. Consider an example where two microservices communicate frequently then it may be desired to co-locate the workloads 122 corresponding to those services within the same worker node 110 or set of worker nodes 110 within the same availability zone so as to ensure acceptable network QOS such as bandwidth, latency, loss, and/or jitter. Similarly, if an application microservice has specific requirements from hardware perspective, e.g., SSD, GPUs, then those specific workloads may need to be allocated on specific nodes 110 with those capabilities.

In accordance with techniques of this disclosure, scheduler 148 schedules workloads 122 to worker nodes 110 using network utilization-aware scheduling. Scheduler 148 may be a custom Kubernetes scheduler configured to schedule one or more workloads 122 based on network utilization information obtained from exporters 135. Consequently, scheduler 148 may address limitations of a default scheduler noted above to schedule workloads 122 in a manner that is sensitive to network utilization for supporting not only the individual workloads 122, but at least in some cases supporting the distributed application as a whole. For example, scheduler 148 may consider the number of MPLS labels that a new workload requires and schedule the new workload to a worker node 110 that has sufficient available MPLS labels to support the requirements of the new workload. Other example bases for scheduling workloads 122 to worker nodes 110 based on network configuration and utilization data for worker nodes 110 are described below.

Scheduler 148 may be an extension to the default Kubernetes scheduler, extended or otherwise customized to consider network requirements while scheduling pods across worker nodes 110. UI device 129 may enable administrator ("admin") 128 to request rescheduling of workloads 122 among worker nodes 110. UI device 129 may one or more computing devices such as a server, laptop, desktop computer, tablet computer, or other computing device. UI device 129 may receive data from orchestrator 130 such as a listing of current workloads 122 and their status on worker nodes 110. UI device 129 may display data via one or more components such as a touch-sensitive display to admin 128. UI device may receive input from admin 128 and provide data regarding the input to orchestrator 130.

The techniques of this disclosure may provide one or more advantages. The use of network configuration and utilization information by orchestrator 130 may improve the scheduling of workloads 122 to workers nodes 110 by ensuring that a worker node has sufficient network resources for a workload. For example, network resources on a given node are often limited and some applications have specific requirements for the availability of these resources. By ignoring the network state, an application could be placed on a node which cannot provide the required network resources. The use of network utilization-aware scheduling may enable orchestrator 130 to ensure that, when scheduling a workload, the workload is placed on a worker node that has sufficient network resources to support the workload. In addition, exporters 135 may enable improved visibility of the status of worker nodes 110 and the available network resources of the worker nodes.

Figure 2:
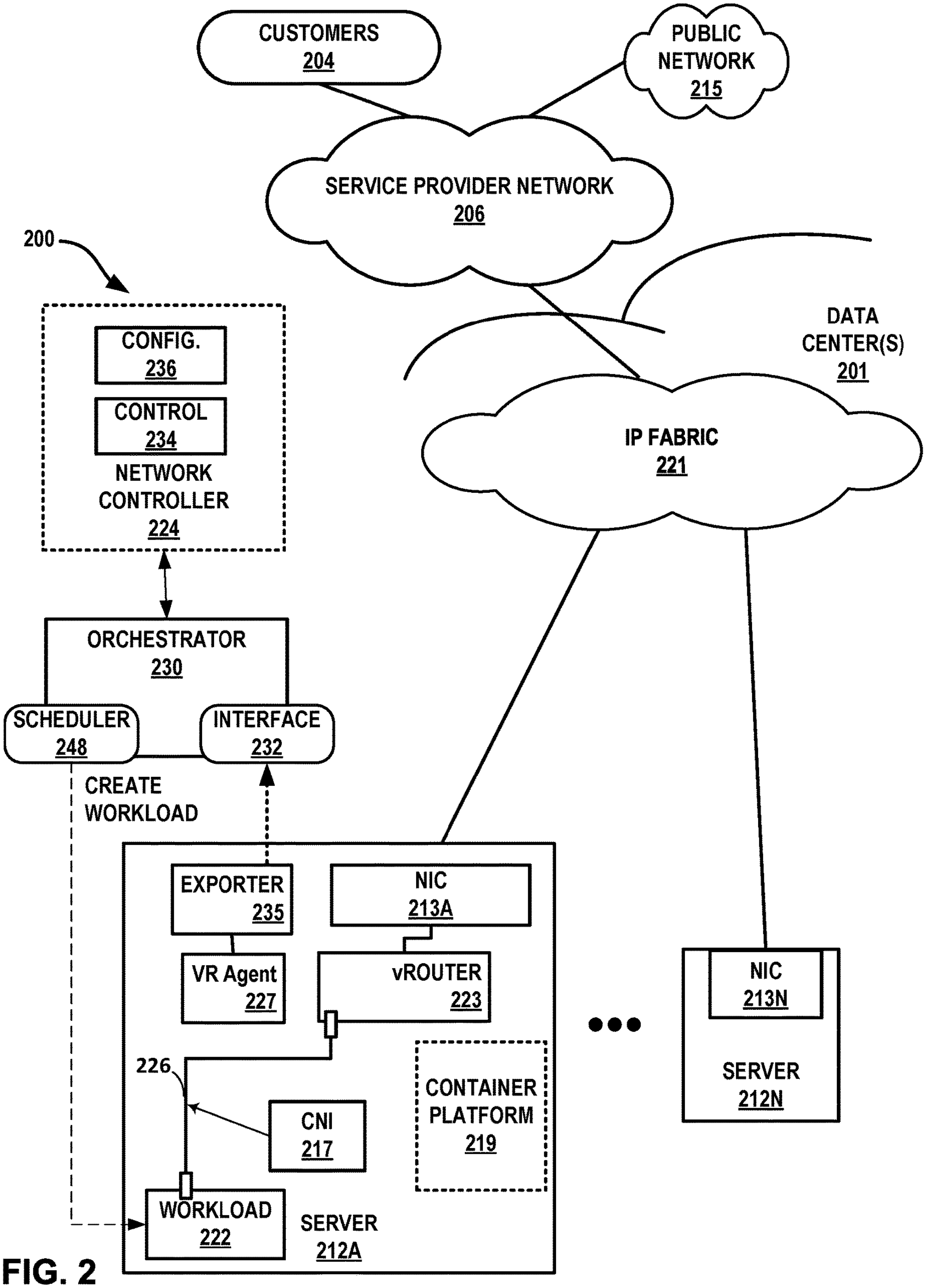
FIG. 2 is a block diagram illustrating an example computing infrastructure, in accordance with techniques described in this disclosure.

FIG. 2 is a block diagram illustrating an example computing infrastructure 200, in accordance with one or techniques of this disclosure. Computing infrastructure 200 may include a cloud-native SDN architecture system. Example use cases for the cloud-native SDN architecture include 5G mobile networks as well as cloud and enterprise cloud-native use cases. An SDN architecture may include data plane elements implemented in compute nodes (e.g., servers 212) and network devices such as routers or switches, and the SDN architecture may also include an SDN controller (e.g., network controller 224) for creating and managing virtual networks. The SDN architecture configuration and control planes are designed as scale-out cloud-native software with a container-based microservices architecture that supports in-service upgrades.

As a result, the SDN architecture components are microservices and may assume a base container orchestration platform to manage the lifecycle of SDN architecture components. A container orchestration platform is used to bring up SDN architecture components; the SDN architecture uses cloud native monitoring tools that can integrate with customer provided cloud native options; the SDN architecture provides a declarative way of resources using aggregation APIs for SDN architecture objects (i.e., custom resources). The SDN architecture upgrade may follow cloud native patterns, and the SDN architecture may leverage Kubernetes constructs such as Multus, Authentication & Authorization, Cluster API, KubeFederation, Kube Virt, and Kata containers. The SDN architecture may support data plane development kit (DPDK) pods, and the SDN architecture can extend to support Kubernetes with virtual network policies and global security policies.

One or more components of computing infrastructure 200 may be similar to that of the components of computing infrastructure 100 as illustrated in FIG. 1. For example, customers 204 may be similar to customers 104, IP fabric may be similar to switch fabric 121, servers 212 may be examples of worker nodes 110, orchestrator 230 similar to orchestrator 130, and so on.

In this example, data center(s) 201 includes storage and/or compute servers (or "nodes") interconnected via IP fabric 221 provided by one or more tiers of physical network switches and routers, and connected to servers 212A-212N (herein, "servers 212"). Servers 212 are computing devices and may also be referred to herein as "compute nodes," "hosts," or "host devices." Servers 212 may each represent a compute server or storage server. For example, each of servers 212 may represent a computing device, such as an x86 processor-based server, configured to operate according to techniques described herein. Servers 212 may provide Network Function Virtualization Infrastructure (NFVI) for an NFV architecture.

One or more of servers 212 each include a virtual router 223 that executes one or more routing instances for corresponding virtual networks within data center 201 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 223 of server 212A, for instance, from the underlying physical network fabric of data center 201 (i.e., IP fabric 221) may include an outer header to allow the physical network fabric to tunnel the payload or "inner packet" to a physical network address for a network interface card 213A of server 212A that executes the virtual router. The outer header may include not only the physical network address of the network interface card 213A of the server but also a virtual network identifier such as a VxLAN tag or Multiprotocol Label Switching (MPLS) label that identifies one of the virtual networks as well as the corresponding routing instance executed by virtual router 223. An inner packet includes an inner header having a destination network address that conforms to the virtual network addressing space for the virtual network identified by the virtual network identifier.

Server 212A includes virtual router agent 227 that controls the overlay of virtual networks for server 212A and that coordinates the routing of data packets within server 212A. In general, virtual router agent 227 communicates with network controller 224 for the virtualization infrastructure, which generates commands to create virtual networks and configure network virtualization endpoints, such as server 212A and, more specifically, virtual router 223, as a well as virtual network interface 226. Additional description of a virtual router agent is found in U.S. patent application Ser. No. 18/468,538, filed 15 Sep. 2023 and titled "DEPLOYMENT CHECKS FOR A CONTAINERIZED SDN ARCHITECTURE SYSTEM," which is incorporated by reference herein in its entirety.

Server 212A includes exporter 235. Each of servers 212 may include an instance of exporter 235. Exporter 235 may be similar to exporters 135 as illustrated in FIG. 1. For example, exporter 235 may execute in a sidecar container alongside virtual router agent 227 for virtual router 223. Exporter 235 may collect messages outputted by virtual router agent 227. Virtual router agent 227 may output messages to one or more components within datacenters 201, and exporter 235 may listen to these messages. For example, virtual router agent 227 may output messages in JSON that are formatted according to an XML over TCP protocol and provide them to a network controller such as network controller 224. Exporter 235 may listen to the messages and export at least some of the messages to orchestrator 230 via interface 232.

Exporter 235 may determine which messages to export and filter messages provided to interface 232. Exporter 235 may filter messages for export based on types of messages sought by orchestrator 230. For example, orchestrator 230 may configure exporter 235 to provide messages about the number of available MPLS labels for a particular server 212 and to drop messages regarding latency of connections to the server. In another example, exporter 235 provides all messages generated by virtual router 223 to network controller 224 and provides a filtered subset of the message to orchestrator 230. In yet another example, exporter 235 is configured to provide messages to one or more consumers of the messages, where each consumer has configured a filter criterion in exporter 235. In a further example, exporter 235 may provide messages to two consumers, FluentD for all message, and orchestrator 230 for filtered messages. Exporter 235 may dynamically load the consumer configurations for message filtering. For example, exporter 235 may use a volume-mounted configuration map with file synchronization with a logging subsystem. Exporter 235 may dynamically load the consumer configurations (filter and destination) to avoid requiring a restart of virtual router 223 each time one or more consumer configurations change. One option for storing the consumer configurations is to use volume mounted ConfigMap with file-sync. Another option is to use volume mounted ConfigMap with file as used by the CN2 logging subsystem.

Exporter 235 may execute in a distributed cluster. In some examples, exporter 235 may collect network utilization data (e.g., metrics) for one or more nodes within a distributed cluster. Exporter 235 may be configured to avoid manual configuration while supporting the collection of metrics within the distributed cluster. For example, exporter 235 may be attached to a central collector service within a customer virtual network that has a fixed CIDR. Exporter 235 may be further configured to create a mirror service in each distributed cluster using the IP address from the CIDR and connect a workload network to the virtual network using virtual network routing or a route target.

Orchestrator 230 and network controller 224 may execute on separate computing devices (e.g., servers 212 or separate servers) or execute on the same computing device. Each of orchestrator 230 and network controller 224 may be a distributed application that executes on one or more computing devices. Orchestrator 230 and network controller 224 may implement respective master nodes for one or more clusters each having one or more minion nodes implemented by respective servers 212.

Orchestrator 230 may configure new distributed clusters to enable the sharing of messages with potential consumers of the messages. For example, orchestrator 230 may configure a new cluster of servers 212 with instances of exporters 235 that may be configured as follows:

- Lifecycle management (LCM) in multi-cluster: When a new distributed cluster is onboarded, it needs to be configured to send events to all consumers.
- Metric Collector Configuration: Global/Local: Global configuration should avoid changing configuration on every distributed cluster but may involve resynchronizing configuration on distributed cluster.
- Integration of Metric Collector code with exporter 235.

In general, network controller 224 controls the network configuration of the data center 10 fabric to, e.g., establish one or more virtual networks for packetized communications among virtual network endpoints. Network controller 224 provides a logically and in some cases physically centralized controller for facilitating operation of one or more virtual networks within data center 201. In some examples, network controller 224 may operate in response to configuration input received from orchestrator 230 and/or an administrator/operator. Additional information regarding example operations of a network controller 224 operating in conjunction with other devices of data center 10 or other software-defined network is found in International Application Number PCT/US2013/044378, filed Jun. 5, 2013, and entitled “PHYSICAL PATH DETERMINATION FOR VIRTUAL NETWORK PACKET FLOWS;” and in U.S. patent application Ser. No. 14/226,509, filed Mar. 26, 2014, and entitled “Tunneled Packet Aggregation for Virtual Networks,” each which is incorporated by reference as if fully set forth herein.

In general, orchestrator 230 controls the deployment, scaling, and operations of containers across clusters of servers 212 and providing computing infrastructure, which may include container-centric computing infrastructure. Orchestrator 230 may be similar to orchestrator 130 as illustrated in FIG. 1 and operate in a similar manner. Orchestrator 230 and, in some cases, network controller 24 may implement respective cluster masters for one or more Kubernetes clusters. As part of determining the deployment and scheduling of workloads such as Kubernetes workloads to pods, orchestrator 230 may obtain network utilization information from servers 212 to aid in scheduling decisions. Orchestrator 230 may obtain network utilization and utilization information from exporter 235 via interface 232. Orchestrator 230 may obtain network utilization information in the form of JSON messages generated by virtual router 223 and forwarded by exporter 235 to interface 232, where interface 232 is a JSON message receiver/sender. Orchestrator 230 may obtain network utilization information and network utilization metrics such as the number of flows, bandwidth utilization, and the number of available and total VMIs. Orchestrator 230 may make scheduling decisions based on the information received from exporter 235.

Orchestrator 230 includes scheduler 248, which may be similar to scheduler 148 illustrated by FIG. 1. Scheduler 248 may be a module, plugin, or other component of orchestrator 248 configured to schedule workloads to worker nodes. For example, scheduler 248 may a Kubernetes scheduler that schedules workloads to pods of a Kubernetes platform. Scheduler 248 may schedule workloads to servers 212 based on network utilization information obtained by orchestrator 230. For example, scheduler 248 may compare network requirements for a new workload to the obtained network utilization metrics and determine candidate nodes for the new workload that meet the network requirements. Scheduler 248 may be a custom Kubernetes scheduler extended to additional metrics such as the network utilization information in scheduling decisions. For example, scheduler 248 may be network utilization-aware and use the network utilization in conjunction with other metrics to place Pods on nodes with the most optimal networking resources.

Server 212A includes a container platform 219 for running containerized applications, such as those of workload 222, that are scheduled by scheduler 248. Container platform 219 receives requests from orchestrator 230 and scheduler 248 to obtain and host, in server 212A, containers. Container platform 219 obtains and executes the containers using workloads 223.

Container network interface (CNI) 217 configures virtual network interfaces for virtual network endpoints. Orchestrator 230, scheduler 248, and container platform 219 use CNI 217 to manage networking for pods and workloads, including workload 222. For example, CNI 217 creates virtual network interfaces to connect workloads to virtual router 223 and enables containers of such pods to communicate, via the virtual network interfaces, to other virtual network endpoints over the virtual networks. CNI 217 may, for example, insert a virtual network interface for a virtual network into the network namespace for containers in workload 222 and configure (or request to configure) the virtual network interface for the virtual network in virtual router 223 such that virtual router 223 is configured to send packets received from the virtual network via the virtual network interface to containers of workload 222 and to send packets received via the virtual network interface from containers of workload 222 on the virtual network. CNI 217 may assign a network address (e.g., a virtual IP address for the virtual network) and may set up routes for the virtual network interface. In Kubernetes, by default all pods can communicate with all other pods without using network address translation (NAT). In some cases, orchestrator 230 and network controller 224 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 230. When a user creates an isolated namespace for workload 222 that is a pod, orchestrator 230 and network controller 240 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

CNI 217 may represent a library, a plugin, a module, a runtime, or other executable code for server 212A. CNI 217 may conform, at least in part, to the Container Network Interface (CNI) specification or the rkt Networking Proposal. CNI 217 may represent a Contrail, OpenContrail, Multus, Calico, cRPD, or other CNI. CNI 217 may alternatively be referred to as a network plugin or CNI plugin or CNI instance. Separate CNIs may be invoked by, e.g., a Multus CNI to establish different virtual network interfaces for workload 222.

CNI 217 may be invoked by orchestrator 230. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

CNI 217 may configure, for workload 222, in conjunction with one or more other components shown in FIG. 1, virtual network interface 226. Any of the containers of workload 222 may utilize, i.e., share, virtual network interface 226 of workload 222.

Virtual network interface 226 may represent a virtual ethernet ("veth") pair, where each end of the pair is a separate device (e.g., a Linux/Unix device), with one end of the pair assigned to workload 222 and one end of the pair assigned to virtual router 223. The veth pair or an end of a veth pair are sometimes referred to as "ports". A virtual network interface may represent a macvlan network with media access control (MAC) addresses assigned to workload 222 and to virtual router 223 for communications between containers of workload 222 and virtual router 223. Virtual network interfaces may alternatively be referred to as virtual machine interfaces (VMIs), pod interfaces, container network interfaces, tap interfaces, veth interfaces, or simply network interfaces (in specific contexts), for instance.

In the example server 212A of FIG. 2, workload 222 is a virtual network endpoint in one or more virtual networks. Orchestrator 230 may store or otherwise manage configuration data for application deployments that specifies a virtual network and specifies that pod 22 (or the one or more containers therein) is a virtual network endpoint of the virtual network. Orchestrator 23 may receive the configuration data from a user, operator/administrator, or other machine system, for instance.

As part of the process of creating workload 222, orchestrator 230 requests that network controller 240 create respective virtual network interfaces for one or more virtual networks (indicated in the configuration data). Workload 222 may have a different virtual network interface for each virtual network to which it belongs. For example, virtual network interface 226 may be a virtual network interface for a particular virtual network. Additional virtual network interfaces (not shown) may be configured for other virtual networks. Network controller 240 processes the request to generate interface configuration data for virtual network interfaces for workload 222. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 224 sends interface configuration data to server 212A and, more specifically in some cases, to virtual router 223. To configure a virtual network interface for workload 222, orchestrator 230 may invoke CNI 217. CNI 217 obtains the interface configuration data from virtual router 223 and processes it. CNI 217 creates each virtual network interface specified in the interface configuration data. For example, CNI 217 may attach one end of a veth pair implementing management interface 226 to virtual router 223 and may attach the other end of the same veth pair to workload 222, which may implement it using virtio-user.

A conventional CNI plugin is invoked by a container platform/runtime, receives an Add command from the container platform to add a container to a single virtual network, and such a plugin may subsequently be invoked to receive a Del (ete) command from the container/runtime and remove the container from the virtual network. The term "invoke" may refer to the instantiation, as executable code, of a software component or module in memory for execution by processing circuitry.

Figure 3:
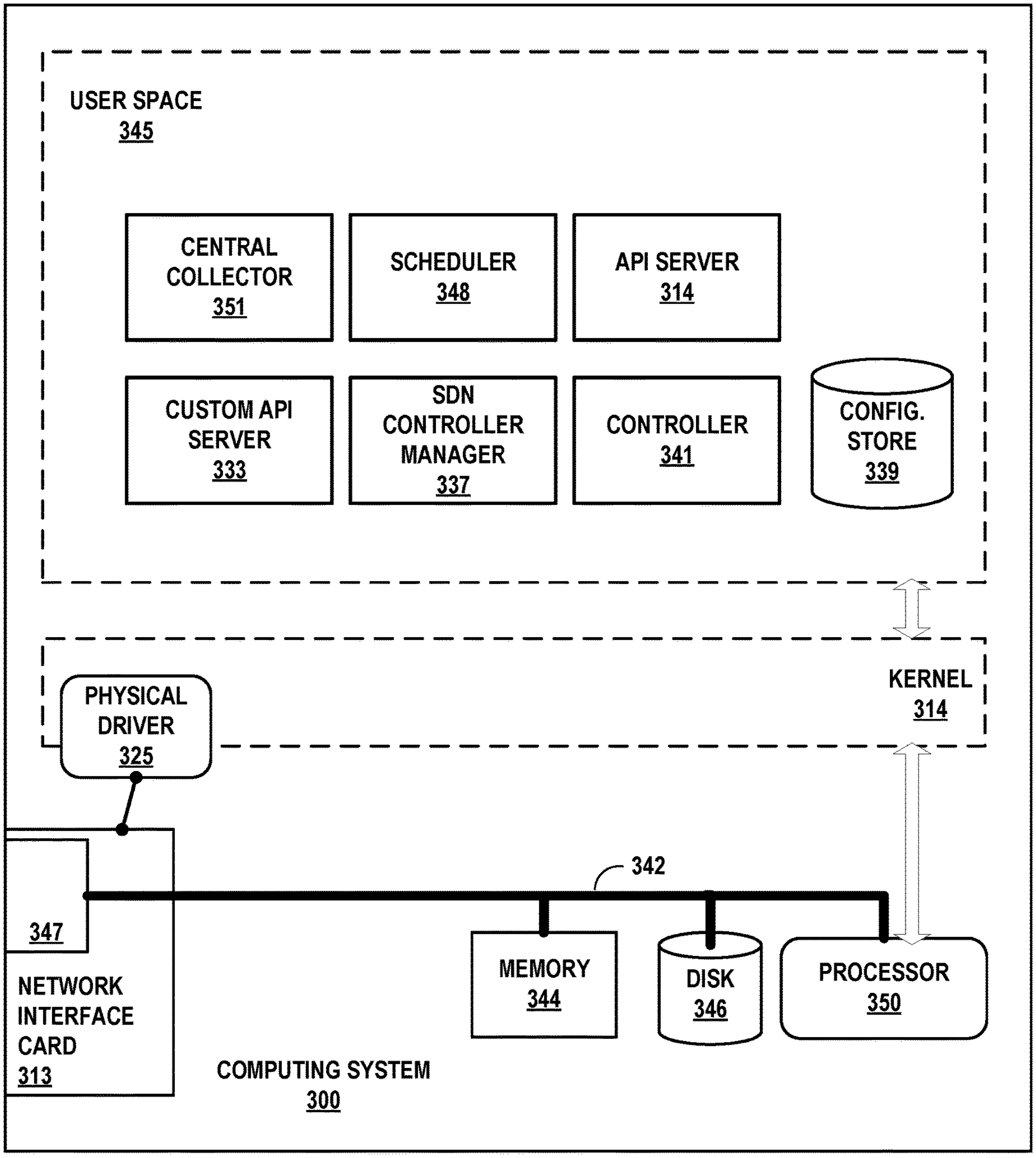
FIG. 3 is a block diagram of an example computing device operating as a compute node, in accordance with one or more techniques of this disclosure.

FIG. 3 is a block diagram illustrating an example computing system 300, in accordance with techniques of this disclosure. Computing system 300 may represent one or more real or virtual servers. Computing system 300 may, in some instances, implement one or more master nodes for respective clusters, or for multiple clusters.

Scheduler 348, API server 314, controller 341, custom API server 333, SDN controller manager 337, central collector 351, and configuration store 339 may be distributed among one or more computing devices that make up computing system 300 or hardware/server cluster. Each of the multiple computing devices, in other words, may provide a hardware operating environment for one or more instances of any one or more of scheduler 348, API server 314, controller 341, custom API server 333, SDN controller manager 337, central collector 351, and configuration store 339.

Computing system 300 includes in this example, a bus 342 coupling hardware components of a computing system 300 hardware environment. Bus 342 couples network interface card (NIC) 313, storage disk 346, and one or more microprocessors 350 (hereinafter, "microprocessor 350", illustrated as "processor 350" in FIG. 3). A front-side bus may in some cases couple microprocessor 350 and memory device 344. In some examples, bus 342 may couple memory device 344, microprocessor 350, and NIC 313. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 350 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 350.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 313 includes one or more interfaces 347 configured to exchange packets using links of an underlying physical network. Interfaces 347 may include a port interface card having one or more network ports. NIC 313 may also include an on-card memory to, e.g., store packet data. Direct memory access transfers between the NIC 313 and other devices coupled to bus 342 may read/write from/to the NIC memory.

Memory 344, NIC 313, storage disk 346, and microprocessor 350 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 313.

Computing system 300 may be coupled to a physical network switch fabric that includes an overlay network that extends switch fabric from physical switches to software or virtual routers of physical servers coupled to the switch fabric, such as virtual routers. Computing system 300 may use one or more dedicated virtual networks to configure minion nodes of a cluster.

API server 314, scheduler 348, controller 341, API server 314, custom API server 333, SDN controller manager 337, central collector 351, and configuration store 339 may implement a master node for a cluster and be alternatively referred to as "master components." The cluster may be a Kubernetes cluster and the master node a Kubernetes master node, in which case the master components are Kubernetes master components.

Each of scheduler 348, API server 314, controller 341, SDN controller manager 337, central collector 351, and configuration store 339 includes code executable by microprocessor 350. A service may be an abstraction that defines a logical set of pods and the policy used to access the pods. The set of pods implementing a service are selected based on the service definition. A service may be implemented in part as, or otherwise include, a load balancer. API server 314 may implement a Representational State Transfer (REST) interface to process REST operations and provide the frontend, as part of the configuration plane for an SDN architecture, to a corresponding cluster's shared state stored to configuration store 339. API server 314 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 348 includes code executable by microprocessor 350. Scheduler 3348 may be one or more computer processes. Scheduler 348 monitors for newly created or requested virtual execution elements (e.g., pods of containers) and selects a minion node on which the virtual execution elements are to run. Scheduler 348 may select a minion node based on resource requirements, hardware constraints, software constraints, policy constraints, locality, etc. Scheduler 348 may represent a Kubernetes scheduler.

In general, API server 314 may invoke the scheduler 348 to schedule a pod. Scheduler 348 may select a minion node and returns an identifier for the selected minion node to API server 314, which may write the identifier to the configuration store 339 in association with the pod. API server 314 may invoke an orchestration agent for the selected minion node, which may cause a container engine for the selected minion node to obtain the pod from a storage server and create the virtual execution element on the minion node. The orchestration agent for the selected minion node may update the status for the pod to the API server 314, which persists this new state to the configuration store 339. In this way, computing system 300 instantiates new pods in the computing infrastructure.

Controller 341 includes code executable by microprocessor 1310. Controller 341 may be one or more computer processes. Controller 341 may embed the core control loops, monitoring a shared state of a cluster by obtaining notifications from API Server 314. Controller 341 may attempt to move the state of the cluster toward the desired state. Controller 341 may manage central collector 351. Other controllers may include a replication controller, endpoints controller, namespace controller, and service accounts controller. Controller 341 may perform lifecycle functions such as namespace creation and lifecycle, event garbage collection, terminated pod garbage collection, cascading-deletion garbage collection, node garbage collection, etc. Controller 341 may represent a Kubernetes Controller Manager for a Kubernetes cluster.

SDN controller manager 337 include code executable by processor 350. SDN controller manager 337 may manage SDN architecture described herein may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

SDN controller manager 337 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances.

SDN controller manager 337 operates as an interface between the orchestration-oriented elements (e.g., scheduler 348, API server 314, controller 341, configuration store 339, and central collector 351). In general, SDN controller manager 337 monitors the cluster for new Kubernetes native objects (e.g., pods and services). SDN controller manager 337 may isolate pods in virtual networks and connect pods with services.

SDN controller manager 337 may be executed as a container of the master node for a cluster. In some cases, using SDN controller manager 337 enables disabling the service proxies of minion nodes (e.g., the Kubernetes kube-proxy) such that all pod connectivity is implemented using virtual routers, as described herein.

Components of SDN controller manager 337 may operate as a CNI for Kubernetes and may support multiple deployment modes. The deployment modes can be divided into two categories: (1) an SDN architecture cluster as a CNI integrated into a workload Kubernetes cluster, and (2) an SDN architecture cluster as a CNI that is separate from the workload Kubernetes clusters.

Integrated with Workload Kubernetes Cluster

Components of a network controller are running in the managed Kubernetes cluster on master nodes, close to the Kubernetes controller components. In this mode, components of the network controller are effectively part of the same Kubernetes cluster as the workloads.

Separate from Workload Kubernetes Clusters

Components of the SDN controller manager 337 will be executed by a separate Kubernetes cluster from the workload Kubernetes clusters.

SDN controller manager 337 may use a controller framework for the orchestration platform to listen for (or otherwise monitor for) changes in objects that are defined in the Kubernetes native API and to add annotations to some of these objects. The annotations may be labels or other identifiers specifying properties of the objects (e.g., "Virtual Network Green"). SDN controller manager 337 is a component of the SDN architecture that listens to Kubernetes core resources (such as Pod, NetworkPolicy, Service, etc.) events and converts those to custom resources for SDN architecture configuration as needed. The CNI plugin is an SDN architecture component supporting the Kubernetes networking plugin standard: container network interface.

SDN controller manager 337 may create a network solution for the application using the REST interface exposed by API server 314 to define network objects such as virtual networks, virtual network interfaces, and access control policies. Network controller components may implement the network solution in the computing infrastructure by, e.g., configuring the one or more virtual network and virtual network interfaces in the virtual routers.

This metadata information may be copied to each pod replica created by the controller 341. When the SDN controller manager 337 is notified of these pods, SDN controller manager 1325 may create virtual networks as listed in annotations ("red-network", "blue-network", and "default/extns-network" in the above example) and create, for each of the virtual networks, a virtual network interface per-pod replica with a unique private virtual network address from a cluster-wide address block (e.g. 10.0/16) for the virtual network.

Additional techniques in accordance with this disclosure are described below. Contrail is an example network controller architecture. Contrail CNI may be a CNI developed for Contrail. A cloud-native Contrail controller may be an example of a network controller described in this disclosure.

Central collector 351 includes code executable by microprocessor 350. Central collector 351 may be one or more computer processes. In an example, central collector 351 is configured as a library with exposed interface to consume network utilization data, which includes metrics for network-related resources consumed by worker nodes, metrics for network-related quantities, or other network-related utilization data. Network-related resources may include NIC bandwidth, virtual router bandwidth, virtual router memory, network ports, CPUs dedicated to the virtual router, virtual machine interfaces/virtual network interfaces, MPLS labels, other labels, or other resources used to implement network connectivity for workloads. Network-related quantities may include number of flows or number of bytes/packets.

Scheduler 348 is configured to import the library of central collector 351 and use the exposed interfaces for consumption of metrics. In another example, central collector 351 exposes interfaces via gRPC. In this example, central collector 351 may be used for closed-loop monitoring and other purposes. Scheduler 348 may then obtain the metrics from the central collector via a gRPC client. Central collector 351 obtains at least one of network configuration data or network utilization data from worker nodes executing within a computing infrastructure. Central collector 351 may configure information exporters (e.g., exporters 135 illustrated by FIG. 1) with the worker nodes to export information. Central collector 351 may configure the information exporters to listen to messages output by virtual routers of the worker nodes and export these messages to central collector 351. In some examples, central collector 351 may configure the information exporters to export a filtered subset of the information collected to central collector 351 and to export the unfiltered set of collected information to a data collection platform executing within the computing infrastructure. For example, central collector 351 may configure the information exporters to only export messages relating to network configuration and network utilization. In the example of a closed-loop configuration of central collector 351, central collector 351 may also obtain the configuration state of the virtual routers and the virtual router agents.

Central collector 351 may obtain network utilization information from one or more worker nodes and servers within the computing infrastructure via the information exporters. Central collector 351 may also obtain network configuration information regarding the configuration of the worker nodes. For example, central collector 351 may obtain network utilization information regarding utilization of network flows by a particular worker node. In another example, central collector 351 may obtain network utilization information regarding the availability of virtual machine interfaces (VMIs) for each worker node for a plurality of worker nodes. Central collector 351 may collect the information and store it for use by one or more components of computing system 300. For example, central collector 351 may store the information in memory 344 or disk 346. Central collector 351 may store a running average of the obtained information. For example, central collector 351 may store an average of the metrics of the obtained information that is an average of the metrics over a predetermined period (e.g., 10 seconds, 30 second, 60 seconds, 5 minutes, etc.). Central collector 351 may store the obtained network utilization information for use by scheduler 348.

Scheduler 348 may make workload and pod scheduling decisions based on information obtained by central collector 351 and the requirements of the workloads and pods. Scheduler 348 may consume the network information and schedule workloads based on the obtained network information. In an example, scheduler 348 receives an indication to schedule a new workload that includes the network requirements of the new workload. Scheduler 348 compares the requirements of the new workload to the network information obtained by central collector 351 and causes one or more components of computing system 300 such as API server 314 to orchestrate the scheduling of the workload alongside scheduler 348. In an example, scheduler 348 receives an indication to schedule a new workload that includes network requirements for availability of MPLS labels and minimum bandwidth. Scheduler 348 processes the indication and compares the network utilization requirements to the obtained network utilization information to determine candidate worker nodes that meet the requirements of the new workload. Scheduler 348, based on determining the candidate nodes, schedules the new workload to a candidate node.

Figure 4:
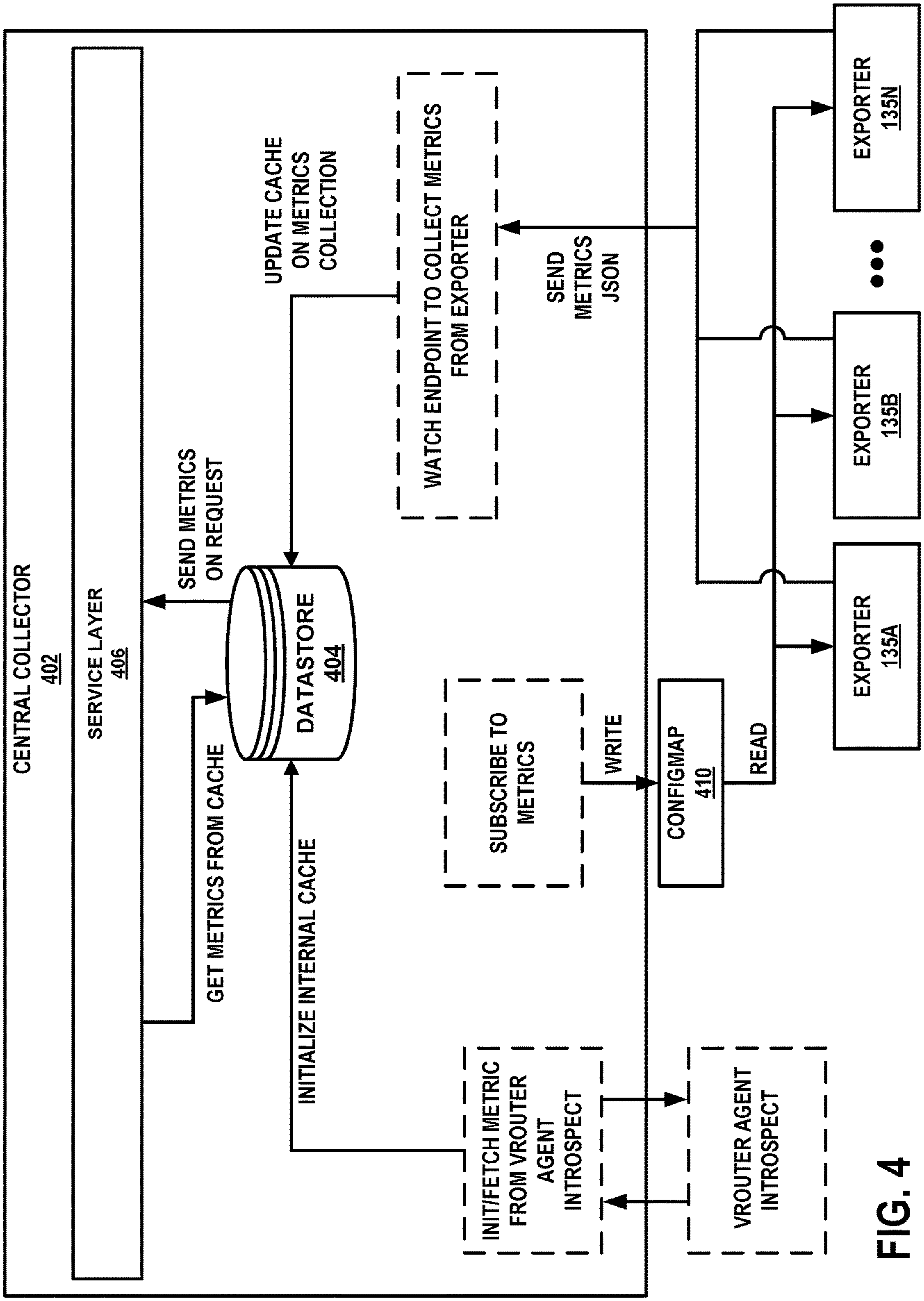
FIG. 4 is a block diagram illustrating an example collector operating in accordance with one or more techniques of this disclosure.

FIG. 4 is a block diagram illustrating an example central collector 402, in accordance with one or more techniques of this disclosure. Central collector 402 may be an example instance of central collector 351 of FIG. 3 and/or of central collector 150 of FIG. 1. Central collector 402 may be executed by a computing system, such as computing system 300. Central collector 402 may acquire information from information exporters executing within worker nodes and servers through a computing infrastructure. In the example of FIG. 4, central collector 402 is a standalone application that exposes interfaces via remote procedure calls (RPCs). In other examples, central collector 402 may be a library that exposes interfaces for consumption of information obtained from information exporters. In a further example, central collector 402 is a stateless application.

Central collector 402 includes service layer 406. Service layer 406 may be a component of central collector 402 such as a layer of a plurality of layers of central collector 402. Service layer 406 may communicate with information exporters and data stores via RPCs. Service layer 406 may leverage RPCs that are part of a high-performance RPC framework such as gRPC.

Central collector 402 includes storage such as datastore 404. Datastore 404 may include one or more of solid state storage, hard disks, tape drives, RAM, cloud storage, and other types of storage. In some examples, datastore 404 may be an internal cache of central collector 402. Datastore 404 may store information for central collector 402 such as network utilization metrics.

Central collector 402 may perform an initial fetch of information such as network utilization metrics of worker nodes. Central collector 402 may perform an initial fetch of information from information exporters (e.g., "INIT/FETCH METRIC FROM VROUTER INTROSPECT" as illustrated in FIG. 4) as central collector 402 may use list-watching to maintain awareness of the network utilization metrics. For example, central collector 402 may initiate an initial fetch to acquire data from information exporters for storage within datastore 404. Central collector 402 may cause agents executing alongside virtual routers of workloads to perform an introspection and acquire data regarding network utilization metrics (e.g., "VROUTER AGENT INTROSPECT" illustrated in FIG. 4) by listening to messages generated by the virtual routers. For example, central collector 402 may cause an agent executing in a sidecar container to copy messages sent by virtual routers of workloads and provide them to central collector 402. Central collector 402 may fetch the messages from the virtual router agents and store them in datastore 404. In some examples, central collector 402 initializes a counter and uses the counter to determine when to refresh the data in datastore 404.

Central collector 402 may subscribe to the collection of network utilization metrics by one or more components of the network infrastructure (e.g., "SUBSCRIBE TO METRICS" as illustrated in FIG. 4). Central collector 402 may write the subscription to a configuration map that maintains information regarding collection subscriptions. For example, central collector 402 may join a subscription that includes receiving network utilization metrics from a plurality of worker nodes.

Central collector 402 may write an indication to ConfigMap 410. In some examples, ConfigMap 410 is an API object used to store data in key-value pairs and can be used to set configuration data separately from application code. Pods can consume ConfigMaps as environment variables, command-line arguments, or as configuration files in a volume. Configmap 410 may be a data structure, application, module, or other software or hardware component that maintains a record of subscriptions and subscribers. For example, ConfigMap 410 may maintain a record of subscriptions by central collector 402. ConfigMap 410 may maintain a record of subscriptions for reporting by one or more worker nodes. For example, ConfigMap 410 may maintain a record of subscriptions by central collector 402 to metric collectors of worker nodes.

Worker nodes within the computing infrastructure include exporters 135, as shown in FIG. 1 (or exporters 235 of FIG. 2). Exporters 135 may be plugins, containerized workloads, modules, or other software components configured to execute alongside the virtual routers of the worker nodes. For example, each worker node within the computing infrastructure may include a virtual router and an instance of exporters 135 executing in a sidecar container alongside the virtual router. Exporters 135 may collect messages generated by the virtual routers of the worker nodes and forward some or all of the messages to one or more components of the computing infrastructure. Exporters 135 may determine which messages are forwarded to particular components based on the record maintained by ConfigMap 410. In an example, exporters 135 read data from ConfigMap 410 regarding subscription information. Exporters 135, based on the subscription information, determine that messages regarding network interface availability for each worker node should be sent to central collector 402. Exporters 135 may serialize the messages generated by the virtual routers into JSON format and provide the JSON text of the messages of network utilization metrics to central collector 402 (e.g., "SEND METRICS JSON" as illustrated in FIG. 4).

Central collector 402 may expose endpoints to receive the messages in JSON format. Central collector 402 may receive JSON messages that include information regarding network utilization metrics of the worker nodes such as bandwidth data, flow count, MPLS label availability, and other metrics. Central collector 402 may watch the endpoints for receipt of JSON messages at "WATCH ENDPOINT TO COLLECT METRICS FROM EXPORTER" as illustrated in FIG. 4. Central collector 402, responsive to receiving the JSON messages, may deserialize the messages.

Central collector 402 may update datastore 404 with obtained network metrics. Central collector 402 may update datastore 404 and avoid using external databases or storage to maintain a record of the network utilization metrics. For example, central collector 402 may update datastore 404 as an internal cache with the metrics collected from Exporters 135 (e.g., "UPDATE CACHE ON METRICS COLLECTION" as illustrated in FIG. 4). As datastore 404 may be an internal cache of central collector 402, central collector 402 may periodically update datastore 404 with the received metrics and cause datastore 404 to drop older metrics from the cache. Datastore 404 may enable central collector 402 to be a stateless application and avoid the need of data persistency for an indefinite period of time. Datastore 404 may send metrics to service layer 406 upon request of central collector 402 (e.g., "SEND METRICS ON REQUEST" as illustrated in FIG. 4). Central collector 402, responsive to receiving the metrics, may expose RPC APIs for use by a custom scheduler in making scheduling decisions for workloads.

Figure 5:
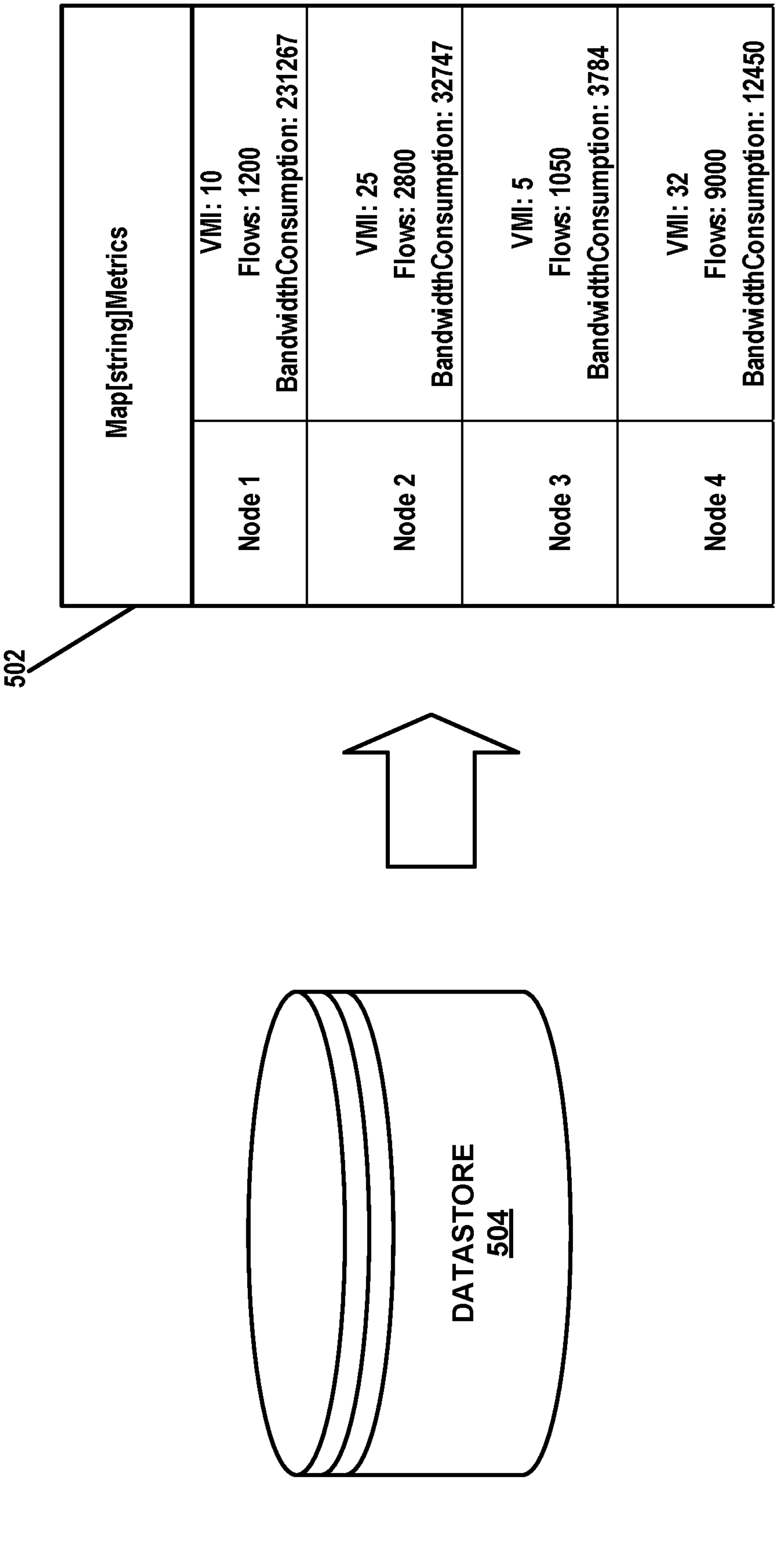
FIG. 5 is a block diagram illustrating an example data store, in accordance with one or more techniques of this disclosure.

FIG. 5 is a block diagram illustrating example datastore 504, in accordance with one or more techniques of this disclosure. Data store 504 may be similar to datastore 404 as illustrated by FIG. 4. For the purposes of clarity, FIG. 5 will be described with respect to FIG. 1.

A central collector, such as central collector 150, includes datastore 504. Datastore 504 may be an internal cache of central collector 150 and store information received from information exporters 135. Datastore 504 may store the received information in one or more types of data structure.

Datastore 504 includes map 502. Map 502 may be a data structure or other type of data mapping within datastore 504. Map 502 may maintain a map of strings that contain node names and network metrics defined by data received by central collector 150. For example, as illustrated in FIG. 5, map 502 includes a string with the node name "Node 1", three types of network metrics (i.e., "VMI", "Flows", and "BandwidthConsumption"), and respective values of the network metrics represented as integer values (e.g., "10", "1200", and "231267").

Central collector 150 may cause datastore 504 to drop older network information without using expiry/timeouts for the values of received network metrics. Central collector 150 may cause datastore 504 to update map 502 when new information is received from a metrics collector or exporter. In an example, central collector 150 receives an update on network metrics for a particular worker node. Central collector 150 updates datastore 504 with the received network metrics. Datastore 504, responsive to receiving the network metrics, drops the oldest network metrics for the particular worker node. Datastore 504 may maintain a buffer of a limited number of datapoints (e.g., 10 datapoints) and average out the datapoints for map 502. Datastore 504 may average the datapoints to reduce the impact of spike readings.

Figure 6:
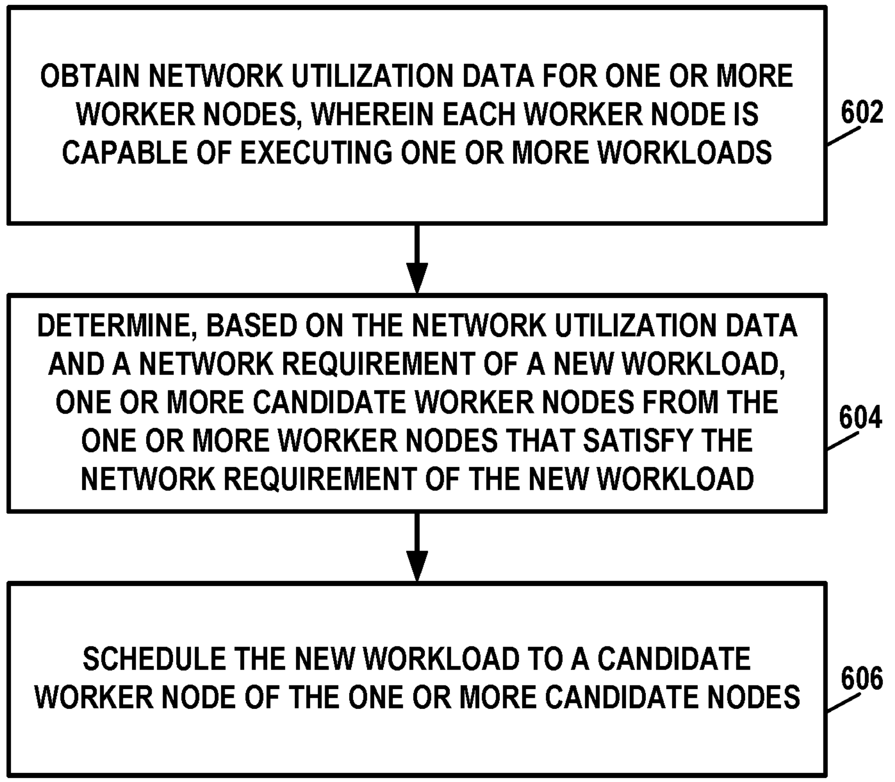
FIG. 6 is a flowchart illustrating an example operation of a computing system, in accordance with one or more techniques of this disclosure.

FIG. 6 is a flowchart illustrating an example operation of a computing system, in accordance with one or more techniques of this disclosure. For the purposes of clarity, FIG. 6 is described with respect to FIG. 1.

A computing system, such as orchestrator 130, obtains network utilization data for one or more worker nodes, such as worker nodes 110, wherein each worker node is capable of executing one or more workloads such as workloads 122 (602). Orchestrator 130 may obtain the network utilization data from worker nodes 110 via exporters 135. In an example, orchestrator 130 obtains network utilization data regarding Multi-Protocol Label Switching labels from worker node 110A. Orchestrator 130 may store the network utilization data obtained from worker nodes 110 in an internal cache.

Orchestrator 130 determines, based on the network utilization data and a network requirement of a new workload, one or more candidate worker nodes from worker nodes 110 that satisfy the network requirement of the new workload (604). In an example, orchestrator 130 determines that three worker nodes of worker nodes 110 satisfy the bandwidth and virtual network interface requirements of the new workload.

Orchestrator 130 schedules the new workload to a candidate worker node of the one or more candidate worker nodes (606). Orchestrator 130 may cause a scheduler, such as scheduler 148, to schedule the new workload to one of the candidate worker nodes. In some examples, orchestrator 130 may use a custom Kubernetes scheduler to schedule the new workload to a candidate worker node.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage media comprising instructions that, when executed, cause one or more processors to perform one or more of the methods described above. For example, the computer-readable data storage media may store such instructions for execution by one or more processors.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. Computer-readable storage media may be distributed among multiple packages, devices, or other components capable of being configured with computer instructions.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising:
processing circuitry having access to storage media and configured to:
implement a container orchestrator;
obtain network utilization data indicative of usage of one or more network-related resources by each of a corresponding one or more worker nodes, wherein the one or more worker nodes are part of a cluster managed by the container orchestrator, and wherein each worker node is capable of executing one or more containerized workloads for a distributed application, and is a physical server;
determine, from among the one or more worker nodes, based on the network utilization data and a network requirement of a new containerized workload, one or more candidate worker nodes that satisfy the network requirement of the new containerized workload; and
schedule, with a scheduler of the container orchestrator, the new containerized workload to a candidate worker node selected from among the determined one or more candidate worker nodes to cause the candidate worker node to obtain the new containerized workload from a storage server and execute the new containerized workload.

2. The computing system of claim 1, wherein to obtain the network utilization data, the processing circuitry is configured to obtain the network utilization data via remote procedure calls to the one or more worker nodes.

3. The computing system of claim 1, wherein the network utilization data indicates one or more of:
a bandwidth; or
an availability of Multi-Protocol Label Switching labels.

4. The computing system of claim 1, wherein the processing circuitry is further configured to:
compute an average of the network utilization data over a period of time; and
determine the one or more candidate worker nodes based on the average of the network utilization data.

5. The computing system of claim 1, further comprising a worker node of the one or more worker nodes, wherein the worker node comprises:
a containerized workload of the one or more containerized workloads for the distributed application; and
a virtual router and virtual router agent for the virtual router,
wherein the virtual router agent collects metrics relating to usage of the virtual router to provide network connectivity to the containerized workload, and
wherein the network utilization data is based on the metrics.

6. The computing system of claim 1, further comprising a worker node of the one or more worker nodes, wherein the worker node comprises:
an exporter;
a containerized workload of the one or more containerized workloads for the distributed application; and
a virtual router and virtual router agent for the virtual router,
wherein the virtual router agent generates and receives messages relating to operation of the virtual router to provide network connectivity to the containerized workload, and
wherein the exporter exports network utilization data that is based on the messages.

7. The computing system of claim 6, wherein the exporter is a sidecar container alongside the virtual router agent.

8. The computing system of claim 6,
wherein the virtual router agent filters the messages relating to operation of the virtual router to obtain a set of filtered messages that relate to network utilization by the worker node, and
wherein to export the network utilization data, the exporter exports the filtered messages.

9. The computing system of claim 1, further comprising:
a central collector,
wherein to obtain the network utilization data, the processing circuitry is configured to execute the central collector to receive network utilization data from respective exporters of the one or more worker nodes.

10. The computing system of claim 1, wherein the processing circuitry is further configured to:
determine, based on the network utilization data, a cluster of worker nodes from one or more clusters that includes at least one of the candidate worker nodes; and
provide the network utilization data to the scheduler of the container orchestrator, wherein the scheduler of the container orchestrator is configured to schedule workloads to worker nodes of the cluster.

11. A method, comprising:
implementing, by a computing system, a container orchestrator;
obtaining, by the computing system, network utilization data indicative of usage of one or more network-related resources by each of a corresponding one or more worker, wherein the one or more worker nodes are part of a cluster managed by the container orchestrator, and wherein each worker node is capable of executing one or more containerized workloads for a distributed application, and is a physical server;
determining, by the computing system, from among the one or more worker nodes, and based on the network utilization data and a network requirement of a new containerized workload, one or more candidate worker nodes that satisfy the network requirement of the new containerized workload; and
scheduling, by the computing system and with a scheduler of the container orchestrator, the new containerized workload to a candidate worker node selected from among the determined one or more candidate worker nodes to cause the candidate worker node to obtain the new containerized workload from a storage server and execute the new containerized workload.

12. The method of claim 11, wherein obtaining the network utilization data comprises obtaining the network utilization data via remote procedure calls to the one or more worker nodes.

13. The method of claim 11, wherein the network utilization data indicates one or more of:

a bandwidth; or an availability of Multi-Protocol Label Switching labels.

14. The method of claim 11, comprising:

computing, by the computing system, an average of the network utilization data over a period of time; and determining, by the computing system, the one or more candidate worker nodes based on the average of the network utilization data.

15. The method of claim 11, wherein the computing system comprises a worker node of the one or more worker nodes, wherein the worker node comprises:

a containerized workload of the one or more containerized workloads for the distributed application; and a virtual router and virtual router agent for the virtual router, wherein the virtual router agent collects metrics relating to usage of the virtual router to provide network connectivity to the containerized workload, and wherein the network utilization data is based on the metrics.

16. The method of claim 11, wherein the computing system further comprises a worker node of the one or more worker nodes, wherein the worker node comprises:

an exporter;

a containerized workload of the one or more containerized workloads for the distributed application; and a virtual router and virtual router agent for the virtual router, wherein the virtual router agent generates and receives messages relating to operation of the virtual router to provide network connectivity to the containerized workload, and wherein the exporter exports network utilization data that is based on the messages.

17. The method of claim 16, wherein the exporter is a sidecar container alongside the virtual router agent.

18. The method of claim 16, wherein the virtual router agent filters the messages relating to operation of the virtual router to obtain a set of filtered messages that relate to network utilization by the worker node, and wherein to export the network utilization data, the exporter exports the filtered messages.

19. The method of claim 11, wherein the computing system further comprises:

a central collector, wherein obtaining the network utilization data further comprises executing the central collector to receive network utilization data from respective exporters of the one or more worker nodes.

20. Non-transitory computer-readable media comprising instructions that, when executed, cause one or more processors to:

implement a container orchestrator;

obtain network utilization data indicative of usage of one or more network-related resources by each of a corresponding one or more worker nodes, wherein the one or more worker nodes are part of a cluster managed by the container orchestrator, and wherein each worker node is capable of executing one or more containerized workloads for a distributed application, and is a physical server;

determine, from among the one or more worker nodes, based on the network utilization data and a network requirement of a new containerized workload, one or more candidate worker nodes that satisfy the network requirement of the new containerized workload; and schedule, with a scheduler of the container orchestrator, the new containerized workload to a candidate worker node selected from among the determined one or more candidate worker nodes to cause the candidate worker node to obtain the new containerized workload from a storage server and execute the new containerized workload.

* * * * *